H. P. OWEN.
PACKING OF PISTONS, PLUNGERS, AND THE LIKE.
APPLICATION FILED MAR. 19, 1912.
1,060,622.
Patented May 6, 1913.
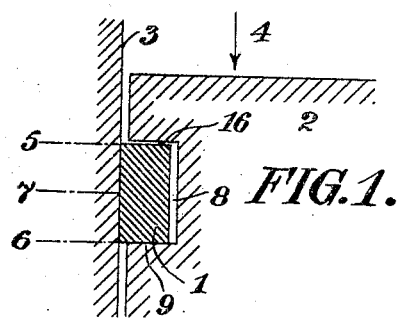
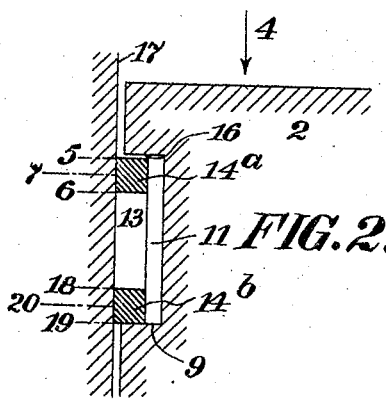
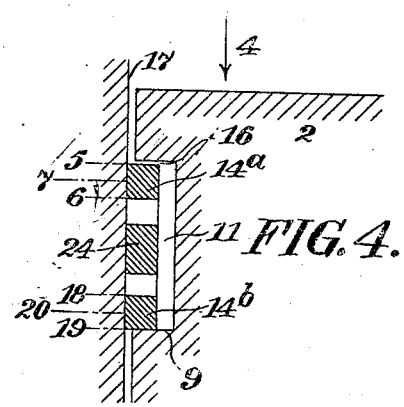
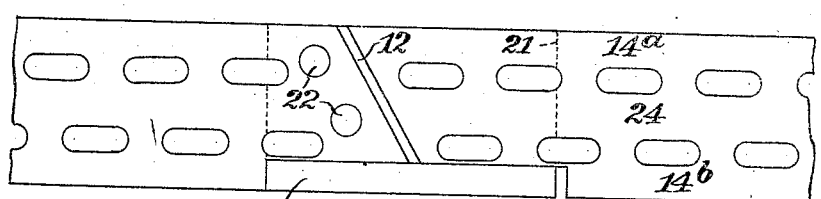
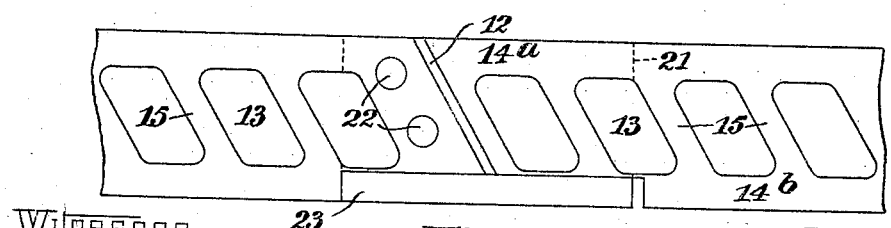
Witnesses
Emanuel M. Henster
Ray J. Ernst.
Inventor
Henry Percy Owen,
By Knight Bros
attys.

UNITED STATES PATENT OFFICE.

HENRY PERCY OWEN, OF LIVERPOOL, ENGLAND.

PACKING OF PISTONS, PLUNGERS, AND THE LIKE.

1,060,622.  Specification of Letters Patent.  Patented May 6, 1913.

Application filed March 19, 1912. Serial No. 684,757.

*To all whom it may concern:*

Be it known that I, HENRY PERCY OWEN, a subject of the King of Great Britain, residing in Liverpool, in the county of Lancaster, in the Kingdom of England, have invented certain new and useful Improvements in or Relating to the Packing of Pistons, Plungers, and the Like, of which the following is a specification.

This invention has reference to improvements in packing rings for the pistons or plungers of steam engines, internal combustion engines, air compressors, pumps and other analogous apparatus.

It is well known that the friction of packing rings on the working barrel of engines, pumps, etc., is very great, due to the pressure of fluid on the back or inside of the ring being in excess of the pressure of the film of fluid existing between the outside or working face of the ring and the walls of the working barrel, and hence the packing rings soon get worn out and break, also the working barrel gets so worn that it requires truing up. To allow for this wear and insure contact between the rings and working barrel many engineers apply springs at the back of the ring which is further detrimental as it accentuates the friction, while others attempt to make the rings a perfectly fluid tight fit in the groove to prevent the admission of fluid into the space at the back of the ring which is obviously impracticable without interfering with the freedom of the ring.

To further explain what I mean, reference is had to Figure 1 of the accompanying drawings, which is a transverse section through an ordinary packing ring, piston, and cylinder, in which 2 is the piston, 1 the packing ring located in a groove in the piston, and 3 the cylinder. Assuming for example that the impelling force on the side 4 of the piston is 100 pounds per square inch, and the pressure on the other side of the piston zero, the ring would be forced hard against the lower side 9 of the groove, sealing the surfaces in contact and thus preventing the passage of fluid, so that the pressure in the space 8 would immediately rise to the higher pressure, *i. e.* 100 lbs. per square inch due to the leakage or passage of fluid through the narrow annular space at 16. This narrow annular space is caused only by the clearance or freedom of the ring. Now between the ring and the walls of the cylinder at 7 there exists a film of fluid, because scientific and practical demonstration proves that contact between solid bodies (notwithstanding true surfaces) exists only at innumerable points, the interstices being occupied by fluid at a pressure dependent on the pressure at the edges of contact. This is a very important point to understand because upon this principle is based the success of my invention and is fully supported in practice. At the point of contact 5 the pressure (taking the assumed figures) is 100 pounds per square inch and at the point of contact 6 the pressure is zero, therefore the pressure of the film of fluid existing between the ring 1 and the cylinder wall 3 must decrease from the point 5 to the point 6 in direct ratio of the distance from these points, giving a mean pressure of 50 lbs. per square inch. Now as before stated there is a pressure of 100 lbs. per square inch in the space 8, acting upon the back of the ring; there is therefore an effective difference of pressure of 50 lbs. per square inch pressing the ring outward against the walls of the cylinder, which accounts for the excessive friction and ultimate destruction through wear of the ordinary types of packing rings. To add to this outward pressure by applying springs behind the packing rings, is further detrimental, as it accentuates friction. Now the present invention has been designed to avoid these defects, and its object is accomplished by causing the fluid at highest working pressure to obtain access behind the ring and also between a portion of the working face of the ring and the working barrel, and so arranging these two opposite pressures, that the ring shall be more nearly in equilibrium, *i. e.* the total pressure behind the ring shall only be a little in excess of the total pressure at the working face. Hence the tightness of the ring against the passage of the fluid is provided for by the slight difference between the total pressure at the back of the ring and that at its working face. Thus the friction between the packing ring and the working barrel is reduced to a minimum and consequently there can be little or no wear of ring or cylinder.

Referring now to Fig. 2 which is a transverse section through the packing ring, piston, and cylinder and Fig. 3, which is a side elevation of a fragment of my packing ring, I form the piston 2 according to my invention with a fairly wide groove or grooves 9 in its periphery, each of which grooves receives a packing ring. The groove 9 is rather deeper than the ring, so that when the ring is inserted into position, there is a space 11 behind the ring. Also the grooves 9 are of such width that the ring is an easy fit in its groove. The ring is of some suitable and elastic material such as cast iron or phosphor bronze, and is of the split ring type, the portion of the metal removed where the split 12 occurs, permitting the ring to close up to the correct diameter of the cylinder. It is in no sense essential to rely on the natural outward spring of the ring to secure tightness against the passage of fluid. In fact, I prefer that its natural spring shall only be sufficient to keep it the same diameter as the cylinder. The ring is formed with holes or ports 13 extending from the inner peripheral surface to the working face of the ring, so as to permit the working fluid to pass through, and thus place the inner and outer peripheral surface of the ring in communication. These ports 13, of which there are any suitable number, are made at close intervals apart all around the full periphery of the ring, leaving narrow portions at 14$^a$ and 14$^b$ at each side of the ring joined together by cross pieces 15 between the ports, these narrow portions and the cross pieces forming the working faces of the packing ring. The ring being an easy fit in the piston groove 9, the working fluid entering at one end of the cylinder, presses the ring laterally against the far end of the groove, and so is able to enter through the narrow annular slit 16 between the ring and the edge of the groove 9 at its working pressure end, into the space 11 behind the packing ring, and the ring being ported the fluid pressure also passes into these ports extending from the inner periphery of the ring to its outer one.

Applying the theory hereinbefore referred to (as to the distribution of pressures) to my improved ring, and assuming as before that the impelling force on the side 4 of the piston is 100 pounds per square inch, and the pressure on the other side is zero, then the pressure of the fluid at the points of contact 5 and 7 so far as regards the narrow portion 14$^a$, is 100 lbs. per square inch, and therefore the pressure of the film of fluid 6 between this portion of the ring and the walls of the cylinder is equal to the pressure on the back of the ring. This portion of the ring, taken individually is therefore in equilibrium with regard to the fluid pressure surrounding it, and would be as freely moved, and with as little friction as if exposed to the ordinary atmospheric pressure. For the same reason the connecting pieces 15 are in equilibrium. With regard to the other narrow portion 14$^b$ the pressure at the point of contact 18 is 100 lbs. and at the point 19, zero, therefore the mean pressure of the film of fluid 20 between this portion of the ring and the cylinder wall will be 50 lbs. per square inch, but the pressure on the back of the ring being 100 lbs. per square inch there is an effective difference of pressure of 50 lbs. per square inch pressing this portion of the ring outward against the walls of the cylinder, but as the area of ring exposed to this difference of pressure is only a fraction of the whole surfaces in contact (since the remainder of the ring is in equilibrium with regard to fluid pressure) the total effective force pressing the ring outward against the walls of the cylinder is only a fraction of what it would be with a plain or ordinary ring. Furthermore, since the whole of the working surfaces are in contact, all portions of these surfaces must support or resist this outward force, so that the outward force, which in total amount is comparatively small, is distributed over the whole working surface of the ring, and therefore at any particular point between metal and metal the outward pressure of the ring on the walls of the cylinder is very small per square inch, but sufficient to insure contact and prevent the passage of fluid from one side of the piston to the other. In an ordinary piston ring the inward pressure is only about half that of the outward pressure, and very much less even than that, when springs are inserted behind the packing rings, but by my invention the inward and outward pressure are more nearly in equilibrium. Consequently there can be no excessive pressure of the ring against the cylinder, friction and wear on the working barrel is reduced, and an increased efficiency of the engine or pump is the result. The packing ring being wide, it provides a considerable bearing surface, which is another great advantage, because the bearing surface is increased while the friction is decreased. When the working pressure is admitted at the opposite end of the cylinder, then of course the ring is pressed laterally against the edge of the groove which was previously at the pressure end of the cylinder, and the end at which the fluid enters into the groove is reversed.

In the drawing, the ring is cut diagonally, and the slit 12 covered by a tongue plate 21 inside the ring and riveted to the ring at 22, this tongue plate having a flange 23 which enters a recess in the edge of the ring, and covers the end of the slit 12, so that no steam can pass through the slit, but any approved tongue piece may be used.

The holes or ports 13 in the ring are preferably as close together and as numerous as the strength of the ring will permit. The cross pieces 15 that separate the ports can be oblique if desired. The piston may be provided with a single groove with a ring in it, or it may have two or more grooves each provided with a ring. The ports however may be any suitable shape, and there may be one, two or more rows of them around the ring as shown in the example depicted in Figs. 4 and 5. If there is more than one row, then of course there are besides the narrow portions 14ª and 14ᵇ at each side of the ring, one or more intermediate portions 24, but it is only the working face of that portion next the exhaust side of the piston that has an inward pressure exerted upon it, less than the outward pressure.

The ring being in one piece, one part cannot press harder against the wall of the cylinder than another part, in other words the narrow portion adjoining the side of greatest pressure, the narrow portion adjoining the side of least pressure, the broad center portion 24 (when provided) and the connecting pieces between the ports (which are in equilibrium with regard to fluid pressure) act as shoes or slippers, supporting and distributing the expanding force over the whole surfaces in contact. By halving the narrow portions 5—7 and 18, 19 or doubling the entire width of the ring, the pressure per square inch exerted between the contact surfaces would be halved, and therefore the coefficient of friction would be halved. Hence I have a ready means of designing my ring to suit any required pressure, e. g. in rings for low pressure where the pressures on the two sides of the piston are small, it would be advisable to increase the width of the narrow portions and lessen the width of the entire ring to insure contact with the cylinder walls and therefore my type of ring first described (Figs. 2 and 3) would be most suitable, whereas with high pressures, the narrow portions 5—7 and 18, 19 require to be reduced and the entire width of the ring increased. With my ring the said narrow portions need not be more than one-fourth of the width of the ring, so that the pressure per square inch, and therefore the coefficient of friction of my ring would not be more than one-fourth that of a plain ring (Fig. 1) and in the case of high pressure pumps where the friction is very great, might with advantage be reduced to one sixteenth.

The attempts that have heretofore been made to put the ring more nearly in equilibrium, have involved the use of grooves around the outside of the ring, with small holes at intervals through it, which in my practical experience are liable to become quickly filled or choked with carbonized oil or other foreign matter, and in the case of a pump bucket, retain solid matter which results in scored barrels, and causes the ring to become nearly equivalent to a solid one. Furthermore these grooves reduce to a greater or less extent the rubbing surface in comparison to the width of the ring. In my ring however, the inside and outside thereof are in open and direct communication through a simple series of ports of relatively large dimensions while leaving a large enough bearing surface of metal to support the small expanding force. Another proposal aimed at hitherto, was to equalize the steam pressure on the inner and outer sides of the piston ring in order to prevent undue friction, and relying on a known definite force in the form of separate springs, to press the ring against the cylinder walls to make a steam tight joint. My present invention however, entirely avoids the use of separate springs.

I declare that what I claim is:—

1. The combination with a piston having an annular peripheral groove; of a packing ring disposed in said groove with sufficient freedom to provide a space between the groove wall and the edge of said ring for admitting high pressure fluid to the inner peripheral surface of said ring and having passageways from its inner peripheral surface to its outer peripheral or bearing surface, the total area of the bearing surface being not less than the effective total area of the internal peripheral surface exposed to ring expanding pressure.

2. The combination of a work piston having an annular packing ring groove, and a packing ring disposed therein with sufficient play to admit maximum fluid pressure to the inner peripheral ring surface, said packing ring having passageways from its inner peripheral surface to its bearing surface to admit maximum fluid pressure to the bearing surface, the total area of the bearing surface being not substantially less than the total area of the projection of the inner peripheral surface on the bearing surface.

3. The combination with a piston cylinder and a piston operating therein, provided with an annular peripheral groove; of a packing ring fitting loosely in said annular groove, with its outer peripheral surface adapted to bear against the cylinder wall, said ring by reason of its loose fit within the annular groove having its inner peripheral surface exposed to maximum pressure tending to expand the ring, and being provided with passageways from its inner peripheral surface to its outer bearing surface, the total area of said bearing surface being not less than the total area of the inner peripheral surface exposed to ring-expending pressure.

In witness whereof, I have hereunto signed my name this 5th day of March 1912, in the presence of two subscribing witnesses.

HENRY PERCY OWEN.

Witnesses:
G. C. DYMOND,
Y. S. SHILLINGTON.